United States Patent
O'Rorke et al.

(10) Patent No.: US 11,078,846 B2
(45) Date of Patent: Aug. 3, 2021

(54) FUEL DELIVERY SYSTEM

(71) Applicant: Hamilton Sundstrand Corporation, Charlotte, NC (US)

(72) Inventors: Morgan O'Rorke, West Hartford, CT (US); Erick Ramos, South Windsor, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 186 days.

(21) Appl. No.: 16/049,459

(22) Filed: Jul. 30, 2018

(65) Prior Publication Data
US 2020/0030720 A1 Jan. 30, 2020

(51) Int. Cl.
| F02C 7/22 | (2006.01) |
| B01D 19/00 | (2006.01) |
| B64D 37/34 | (2006.01) |
| F01D 15/08 | (2006.01) |
| B01D 46/00 | (2006.01) |

(52) U.S. Cl.
CPC ........... *F02C 7/22* (2013.01); *B01D 19/0031* (2013.01); *B01D 46/00* (2013.01); *B01D 2257/104* (2013.01); *B64D 37/34* (2013.01); *F01D 15/08* (2013.01); *F23K 2900/05082* (2013.01)

(58) Field of Classification Search
CPC ......... B01D 19/0031; B01D 2257/104; B01D 46/00; F02C 7/22; F01D 15/08; B64D 37/34; F23K 2900/05082
See application file for complete search history.

(56) References Cited

U.S. PATENT DOCUMENTS

| 6,315,815 B1 | 11/2001 | Spadaccini et al. |
| 8,177,884 B2 | 5/2012 | Schmidt et al. |
| 9,120,580 B2 | 9/2015 | Sampath |
| 9,724,625 B2* | 8/2017 | Lo ............... B01D 19/0005 |
| 9,834,315 B2 | 12/2017 | Lo et al. |
| 9,897,100 B2 | 2/2018 | Laboda et al. |
| 2002/0000067 A1* | 1/2002 | Numata ............. C01B 3/386 48/61 |
| 2010/0257839 A1 | 10/2010 | Watkins et al. |
| 2011/0094378 A1* | 4/2011 | Mitariten ............ B01D 53/229 95/50 |
| 2013/0305738 A1* | 11/2013 | Hughes ............... F02C 7/22 60/780 |

FOREIGN PATENT DOCUMENTS

| EP | 2617649 A2 | 7/2013 |
| JP | 2005282397 A | 10/2005 |

OTHER PUBLICATIONS

European Search Report for Application No. 19186962.7 dated Dec. 20, 2019; 7 pages.

* cited by examiner

*Primary Examiner* — Jonathan Miller
*Assistant Examiner* — Gabriel E Gitman
(74) *Attorney, Agent, or Firm* — Cantor Colburn LLP

(57) ABSTRACT

A fuel delivery system includes a turbine, a pump, and an oxygen removal unit. The turbine is adapted to receive and expel fuel at different pressures. The pump is in fluid communication with, and mechanically coupled to, the turbine, and is configured to expel and receive the fuel at about the respective different pressures. The turbine is configured to convert pressure energy of the fuel to kinetic energy to drive the pump. The oxygen removal unit is in fluid communication with at least one of the turbine and the pump, and is configured to remove oxygen from the fuel.

12 Claims, 1 Drawing Sheet

FUEL DELIVERY SYSTEM

BACKGROUND

The present disclosure relates to fuel delivery systems, and more particularly to fuel delivery systems capable of fuel conditioning.

Fuel delivery systems typically supply fuel to combustion engines at a prescribed pressure for combustion. The same fuel delivery systems may also function to condition the fuel. Examples of such conditioning may be the filtration and removal of particulate, and/or the removal of oxygen. Whether a filter unit or an oxygen removal unit, each unit may most effectively operate at fuel pressures which are different than the needed, or required, inlet fuel pressure of the combustion engine. Improved means of controlling fuel pressure for optimal performance of various fuel conditioning units is desirable.

In one application, the fuel delivery system may be a jet fuel system, where jet fuel at elevated temperatures and elevated pressures is utilized. In some systems, the fuel is first utilized as a coolant prior to combustion within a jet engine. It is not uncommon to see fuel supply temperatures ranging from 350° F. to upwards of 900° F. At such temperatures, the presence of dissolved oxygen is undesirable because the oxygen promotes oxidation reactions that produce undesirable by-products. The oxygen initiates free radical reactions of the fuel resulting in deposits referred to as "coke" or "coking." Therefore, it is desirable to remove the oxygen from the fuel. Such removal, however, may be further complicated in high pressure fuel systems.

BRIEF DESCRIPTION

A fuel delivery system according to one, non-limiting, embodiment including a turbine adapted to receive and expel fuel at different pressures; a pump in fluid communication with and mechanically coupled to the turbine, and configured to expel and receive the fuel at about the respective different pressures, wherein the turbine is configured to convert pressure energy of the fuel to kinetic energy to drive the pump; and an oxygen removal unit in fluid communication with at least one of the turbine and the pump and configured to remove oxygen from the fuel.

Additionally to the foregoing embodiment, the oxygen removal unit is located between the turbine and the pump for receiving the fuel from the turbine and expelling the fuel to the pump.

In the alternative or additionally thereto, in the foregoing embodiment, the turbine is adapted to receive fuel in an oxygenated condition and at a high pressure and expel the fuel in the oxygenated condition and at a low pressure to the oxygen removal unit, and the pump is adapted to receive the fuel in a deoxygenated condition and at the low pressure and expel the fuel in the deoxygenated condition and at the high pressure.

In the alternative or additionally thereto, in the foregoing embodiment, the fuel delivery system further includes a turbine inlet conduit in fluid communication with the turbine, and adapted to flow the fuel in the oxygenated condition and at the high pressure; a turbine outlet conduit extending between and in fluid communication with the turbine and the oxygen removal unit, and adapted to flow the fuel in the oxygenated condition and at the low pressure; a pump inlet conduit extending between and in fluid communication with the oxygen removal unit and the pump, and adapted to flow the fuel in the deoxygenated condition and at the low pressure; and a pump outlet conduit in fluid communication with the pump, and adapted to flow the fuel in the deoxygenated condition and at a high pressure.

In the alternative or additionally thereto, in the foregoing embodiment, the oxygen removal unit is a membrane type.

In the alternative or additionally thereto, in the foregoing embodiment, the fuel delivery system further includes a fuel filter in fluid communication between the turbine and the pump, wherein the fuel filter receives fuel at a high pressure of the different pressures from the pump and expels the fuel at about the high pressure to the turbine, and the oxygen removal unit receives the fuel at a low pressure of the different pressures from the turbine.

In the alternative or additionally thereto, in the foregoing embodiment, the pump receives the fuel at about the low pressure.

In the alternative or additionally thereto, in the foregoing embodiment, the fuel delivery system is a jet fuel delivery system.

A fuel delivery system according to another, non-limiting, embodiment includes a turbine configured to receive fuel at a high pressure and expel the fuel at a low pressure; a pump coupled to and in fluid communication with the turbine and configured to receive the fuel at about the low pressure and expel the fuel at about the high pressure, wherein the turbine is adapted to convert pressure energy of the fuel to kinetic energy to drive the pump; and a fuel conditioning unit disposed between and in fluid communication with the turbine and the pump, wherein the fuel conditioning unit is configured to operate more effectively at one of the high and low pressures.

Additionally to the foregoing embodiment, the fuel conditioning unit is a filter unit constructed to remove particulate in the fuel.

In the alternative or additionally thereto, in the foregoing embodiment, the filter unit operates more effectively at the high pressure.

In the alternative or additionally thereto, in the foregoing embodiment, the filter unit is disposed downstream from the pump and upstream from the turbine/

In the alternative or additionally thereto, in the foregoing embodiment, the fuel conditioning unit is an oxygen removal unit constructed to remove oxygen from the fuel.

In the alternative or additionally thereto, in the foregoing embodiment, the oxygen removal unit operates more effectively at the low pressure.

In the alternative or additionally thereto, in the foregoing embodiment, the oxygen removal unit is disposed upstream from the pump and downstream from the turbine.

In the alternative or additionally thereto, in the foregoing embodiment, the fuel delivery system is an aviation fuel delivery system and the oxygen removal unit is configured to reduce coking.

In the alternative or additionally thereto, in the foregoing embodiment, low pressure is less than 150 psia.

The foregoing features and elements may be combined in various configurations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
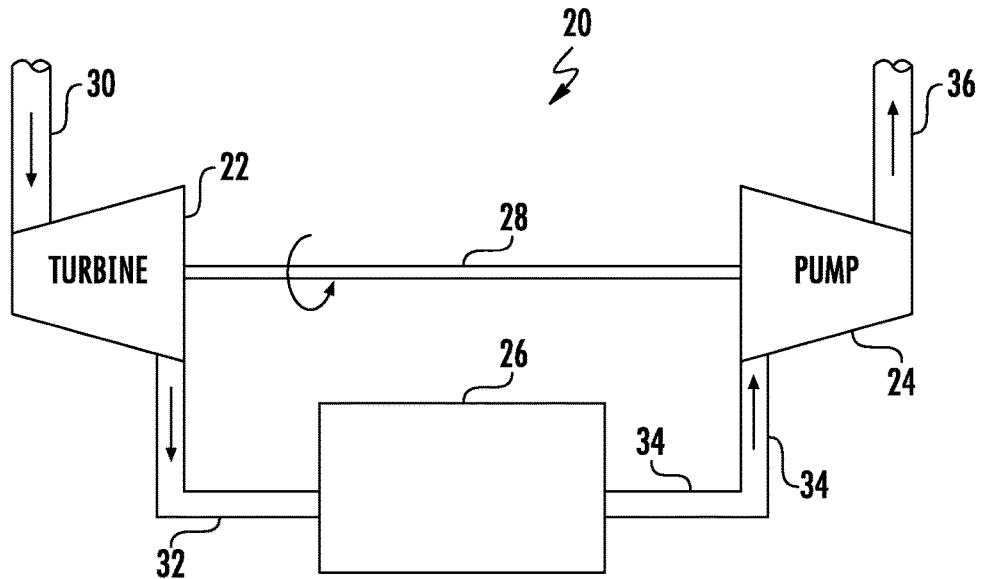
FIG. 1 is a schematic of a deoxygenating fuel delivery system according to one, non-limiting, exemplary embodiment of the present disclosure.

Referring to FIG. 1, a fuel delivery system 20 (e.g., deoxygenating fuel delivery system) includes a turbine 22, a pump 24, and a fuel conditioning unit 26 (e.g., oxygen removal unit). In one embodiment, the turbine 22 is mechanically attached to the pump 24 via a rotating shaft 28. The oxygen removal unit 26 is adapted to remove oxygen from hydrocarbon fuel to reduce, or eliminate, undesirable oxidation reactions that may, for example, producing "coking" effects. The oxygen removal unit 26 may operate most effectively at relatively low fuel pressures. Non-limiting examples of the oxygen removal unit 26 include those disclosed in U.S. Pat. No. 6,315,815, issued Nov. 13, 2001, and U.S. Pat. No. 7,153,343, issued Dec. 26, 2006, both incorporated herein by reference in their entirety. One, non-limiting, application of the deoxygenating fuel delivery system 20 is that of a jet engine. One example of fuel, is jet fuel, however any other type of hydrocarbon fuel may be applicable to the present disclosure. One, non-limiting, example of an oxygen removal unit 26 may be of a membrane type with limited capability of operating under high fuel pressure conditions (e.g., greater than 150 psia).

The deoxygenating fuel delivery system 20 may further include a turbine inlet conduit 30, a turbine outlet conduit 32, a pump inlet conduit 34, and a pump outlet conduit 36. The oxygen removal unit 26 is disposed between and is in fluid communication with the turbine outlet conduit 32 and the pump inlet conduit 34. In one embodiment, the turbine inlet conduit 30 and the pump outlet conduit 36 flow the fuel at a high pressure, and the turbine outlet conduit 32 and the pump inlet conduit 34 may flow the fuel at a relatively low fuel pressure. Moreover, the fuel in the turbine inlet and outlet conduits 30, 32 may be in an oxygenated condition, and the fuel in the pump inlet and outlet conduits 34, 36 may be in a deoxygenated condition. The term "low pressure" means any pressure or pressure range suitable for effective and efficient operation of the oxygen removal unit 26, and the term "high pressure" means any pressure that is higher than the low pressure and is generally not ideal for proper and efficient operation of the oxygen removal unit 26. As one example, low pressure is less than 150 psia, and high pressure is greater than 150 psia.

During operation, high pressure fuel, in an oxygenated condition, enters the turbine 22 via the turbine inlet conduit 30. The turbine 22 is constructed to convert pressure energy of the incoming fuel to kinetic energy, thus enabling rotation of the shaft 28 and operation of the pump 24. Conversion of the pressure energy, causes the high pressure fuel entering the turbine 22 to exit via the turbine outlet conduit 32 at the low pressure. The low pressure fuel then enters the oxygen removal unit 26 that alters the fuel from the oxygenated condition to the deoxygenated condition. The fuel at the low pressure and in the deoxygenated condition then enters the pump 24. The pump 24 works the fuel, and the fuel exits the pump 24 via the pump outlet conduit 36 at the high pressure and in the deoxygenated condition for combustion within an engine (not shown). In one embodiment, the oxygenated condition represents oxygen in fuel at about 70 ppm and the deoxygenated condition at about 10 ppm.

Figure 2:
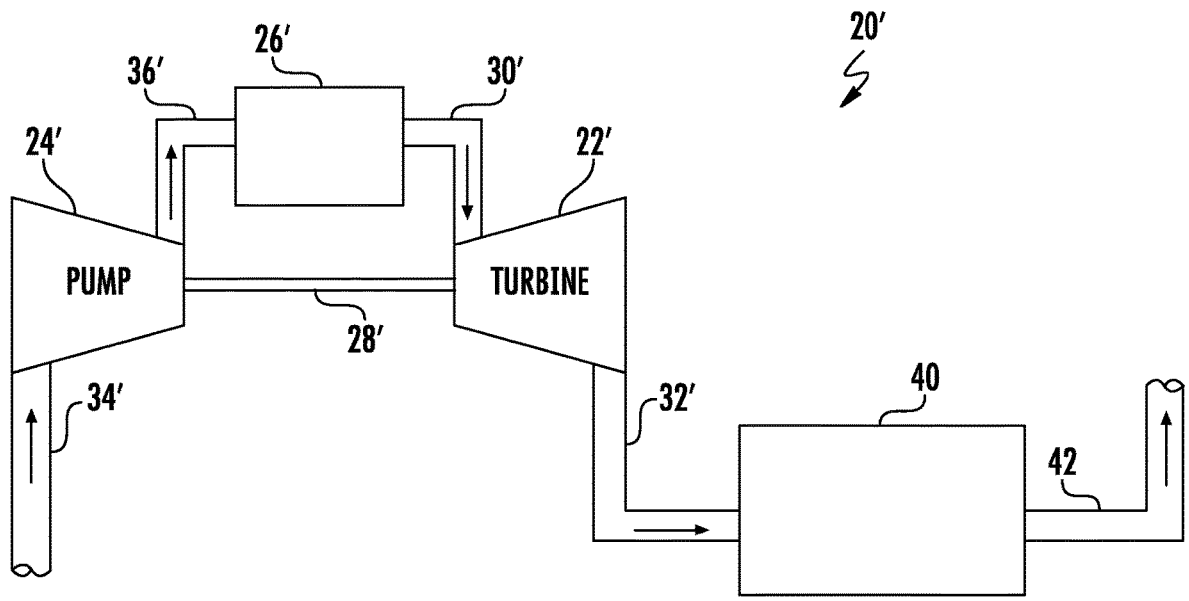
FIG. 2 is a schematic of a second embodiment of a deoxygenating fuel delivery system.

Referring to FIG. 2, a second embodiment of a fuel delivery system is illustrated where like elements to the first embodiment have like identifying numerals except with the addition of a prime symbol suffix. A deoxygenating fuel delivery system 20' includes a turbine 22', a pump 24', a fuel conditioning unit 26' (e.g., particulate filter unit), a rotating shaft 28', and an oxygen removal unit 40. The fuel delivery system 20' may further include a turbine inlet conduit 30', a turbine outlet conduit 32', a pump inlet conduit 34', a pump outlet conduit 36' and an oxygen removal unit outlet conduit 42.

In this embodiment, the fuel conditioning unit 26' may be filter unit adapted to filter particulates from the fuel. The filter unit 26' is disposed between and is in fluid communication with the pump outlet conduit 36' and the turbine inlet conduit 30'. Like the first embodiment, the turbine inlet conduit 30' and the pump outlet conduit 36' flow the fuel at a high pressure, and the turbine outlet conduit 32' and the pump inlet conduit 34' may flow the fuel at a relatively low fuel pressure.

Further to this second embodiment, the fuel in the conduits 30', 32', 34', 36', the pump 24', the filter unit 26', and the turbine 22' is in an oxygenated condition, and the fuel in the oxygen removal unit outlet conduit 42 is in a deoxygenated condition. The term "high pressure" means any pressure or pressure range suitable for effective and efficient operation of the filter unit 26', and the term "low pressure" means any pressure that is lower than the high pressure and is generally not ideal for proper and efficient operation of the filter unit 26', but may be optimal for efficient operation of the oxygen removal unit 40.

Advantages and benefits of the present disclosure include placement of oxygen removal units in high pressure fuel systems where previously not available. Another advantage is the ability to place oxygen removal units in high pressure lines while minimizing the amount of energy loss, and increasing fuel performance as a heatsink. Yet further, the present disclosure provides a more robust and efficiently operating system with an increase in design options.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A fuel delivery system comprising:
   a turbine adapted to receive fuel at a first high pressure and expel the fuel at a first low pressure;
   a pump in fluid communication with and mechanically coupled to the turbine, and configured to expel the fuel at a second high pressure and receive the fuel at a second low pressure, wherein the turbine is configured to convert pressure energy of the fuel to kinetic energy to drive the pump, and the first and second low pressures are both lower than either of the first and second high pressures; and
   an oxygen removal unit in fluid communication with at least one of the turbine and the pump and configured to remove oxygen from the fuel, wherein the first and second high pressures are higher than an efficient operating pressure of the oxygen removal unit, and wherein the oxygen removal unit is located between the turbine and the pump for receiving the fuel from the turbine and expelling the fuel to the pump.

2. The fuel delivery system set forth in claim 1, wherein the turbine is adapted to receive fuel in an oxygenated condition and expel the fuel in the oxygenated condition to the oxygen removal unit, and the pump is adapted to receive the fuel in a deoxygenated condition and expel the fuel in the deoxygenated condition.

3. The fuel delivery system set forth in claim 2, further comprising:
a turbine inlet conduit in fluid communication with the turbine, and adapted to flow the fuel in the oxygenated condition;
a turbine outlet conduit extending between and in fluid communication with the turbine and the oxygen removal unit, and adapted to flow the fuel in the oxygenated condition;
a pump inlet conduit extending between and in fluid communication with the oxygen removal unit and the pump, and adapted to flow the fuel in the deoxygenated condition; and
a pump outlet conduit in fluid communication with the pump, and adapted to flow the fuel in the deoxygenated condition.

4. The fuel delivery system set forth in claim 1, wherein the oxygen removal unit comprises a membrane.

5. The fuel delivery system set forth in claim 1, wherein the fuel delivery system is a jet fuel delivery system.

6. A fuel delivery system comprising:
a turbine adapted to receive fuel at a first high pressure and expel the fuel at a first low pressure;
a pump in fluid communication with and mechanically coupled to the turbine, and configured to expel the fuel at a second high pressure and receive the fuel at a second low pressure, wherein the turbine is configured to convert pressure energy of the fuel to kinetic energy to drive the pump, and the first and second low pressures are both lower than either of the first and second high pressures;
an oxygen removal unit in fluid communication with at least one of the turbine and the pump and configured to remove oxygen from the fuel, wherein the first and second high pressures are higher than an efficient operating pressure of the oxygen removal unit; and
a fuel filter in fluid communication between the turbine and the pump, wherein the fuel filter receives the fuel at the second high pressure from the pump and expels the fuel at a third high pressure closer to the first high pressure than the second high pressure, and wherein the oxygen removal unit receives the fuel at the first low pressure.

7. The fuel delivery system set forth in claim 6, wherein the first low pressure equals the second low pressure.

8. A fuel delivery system comprising:
a turbine configured to receive fuel at a first high pressure and expel the fuel at a first low pressure;
a pump coupled to and in fluid communication with the turbine and configured to receive the fuel at a second low pressure and expel the fuel at a second high pressure, wherein the turbine is adapted to convert pressure energy of the fuel to kinetic energy to drive the pump; and
a fuel conditioning unit disposed between and in fluid communication with the turbine and the pump, wherein the fuel conditioning unit is configured to operate more efficiently at one of a high pressure range and a low pressure range than the other of the high pressure range and the low pressure range, wherein the high pressure range includes of the first and second high pressures and the low pressure range includes the first and second low pressures, wherein the fuel delivery system is a jet fuel delivery system, and wherein the fuel conditioning unit is an oxygen removal unit constructed to remove oxygen from the fuel.

9. The fuel delivery system set forth in claim 8, wherein the oxygen removal unit operates more efficiently at the low pressure range than the high pressure range.

10. The fuel delivery system set forth in claim 9, wherein the oxygen removal unit is disposed upstream from the pump and downstream from the turbine.

11. The fuel delivery system set forth in claim 10, wherein the fuel delivery system is an aviation fuel delivery system and the oxygen removal unit is configured to reduce coking.

12. The fuel delivery system set forth in claim 11, wherein the first low pressure and the second low pressure are less than 150 psia.

* * * * *